No. 608,886. Patented Aug. 9, 1898.
T. L. MARVEL.
ROPE COUPLING.
(Application filed Dec. 28, 1897.)
(No Model.)
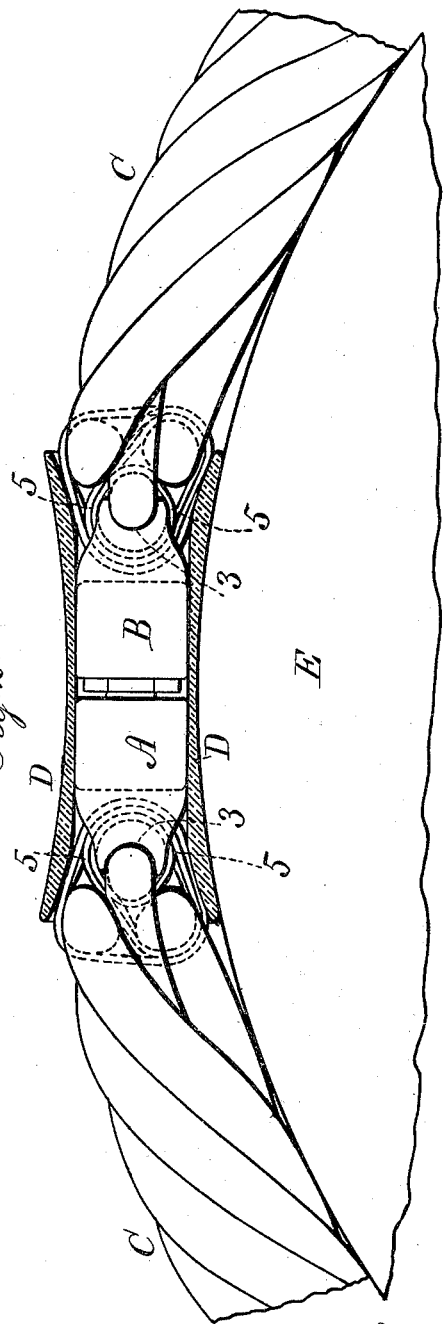
Witnesses:
J. Staib
Chas H Smith
Inventor
Theodore L Marvel
per L. W. Serrell & Son
Attys.
THE NORRIS PETERS CO., PHOTO-LITHO., WASHINGTON, D. C.

UNITED STATES PATENT OFFICE.

THEODORE L. MARVEL, OF TAUNTON, MASSACHUSETTS.

ROPE-COUPLING.

SPECIFICATION forming part of Letters Patent No. 608,886, dated August 9, 1898.

Application filed December 28, 1897. Serial No. 663,822. (No model.)

*To all whom it may concern:*

Be it known that I, THEODORE L. MARVEL, a citizen of the United States, residing at Taunton, in the county of Bristol and State of Massachusetts, have invented a new and useful Improvement in Rope-Couplings, of which the following is a specification.

Manila, hemp, and other ropes are extensively employed in hoisting and conveying apparatus, and they have been joined up, so as to be endless, by means of metallic couplings, and the strands of the ropes have been threaded through the metallic eyes at the ends of the couplings; but in practice it has been found difficult to prevent the strands of the rope becoming worn and abraded by the movement between the metal portions of the couplings and the rope-strands. In these couplings that have before been employed half of the strands have been passed through the eyes upon the metallic portions of the coupling and the strands turned back upon the rope and spliced, so as to obtain uniformity of strength, or nearly so, without materially increasing the diameter of the rope.

Various forms of connecting devices have been used with the metal end portions of the coupling after being united to the rope for connecting the ends of the rope when brought together. A coupling device of this character is shown in my Patent No. 580,214, granted April 6, 1897; but it is to be understood that the present improvements do not relate to the devices for connecting the metal couplings the one to the other, but they relate to the means for connecting the ends of the rope to the metal couplings.

Instead of passing the strands of the rope through metallic eyes the strands of the rope are folded back upon themselves, and the ends of the metal couplings are recessed to receive such strands, and through the metal portions of the couplings openings are made for the passage of strong cord that is served around the strands and through the openings in the end portions of the couplings, so as to confine the folded ends of the strands into and against the recessed ends of the metal couplings.

In the metal couplings heretofore employed the metal portion is generally of smaller diameter than the rope itself. The consequence is that as the metal coupling comes into contact with the pulley around which the rope passes there is an unnecessary amount of motion between the metal coupling and the rope itself and a concussion of the end portion of the rope against the pulley tending to increase wear and also to produce a movement that causes the rope to vibrate or run irregularly. To avoid this difficulty, I surround the metal coupling with a sleeve of suitable material—such as leather, rubber, or rawhide—and the sleeve may have flaring ends to extend over the strands of the rope where they are united to the metal of the coupling to protect the portion most exposed to wear, and this sleeve may be advantageously made thinner in the middle portion than at the ends, so as to approximate in contour to the arc of the circle of the pulley with which the coupling comes in contact, thereby preventing any undue movement of the coupling in relation to the rope and avoiding concussion and inequality in the movement of the rope itself.

In the drawings, Figure 1 is a longitudinal section representing the improved coupling with the rope attached at one end. Fig. 2 is an elevation of the metal coupling in the rope ends and a section of the sleeve as resting upon a portion of the pulley.

The metal portions A B of the coupling are provided with connecting devices of any suitable character. I have illustrated devices similar to those shown in my aforesaid patent.

The outer end portions of the couplings A and B are provided with recesses 3 and with cross-openings 4 adjacent to said recesses, and the shape of each recess may approximate the shape of folded strands at the end of the rope C, so that when a strand of the rope has been folded the fold thereof can be placed into the recesses 3, and then a serving 5 of strong flax cord or similar material is to be wound around the strand and the end of the coupling, the serving passing through the cross-opening 4 and around the strands, and after one strand has been secured in this manner a second or third strand is to be applied and secured by the serving as aforesaid; and I remark that the recess 3 may be of a shape adapted to receive two strands of the rope side by side, so that the serving secures the two strands simultaneously; and it will be observed that in either form the rope itself is not exposed to friction or wear by contact with the metal of the coupling, the strain coming entirely upon the serving, and in practice it is found that the requisite strength can be obtained, because the serving can be stronger than the rope itself without necessarily being of greater bulk than the rope and without increasing the diameter, so that the connection is not larger than the rope itself. The manner in which the ends of the strands are spliced into the rope is not illustrated, as such splicing will be of any usual or desired character.

The metal coupling portions A and B can be of as great strength as the fibrous rope and at the same time of smaller diameter; and to prevent the difficulties heretofore mentioned the sleeve D is applied around the couplings A B, and this sleeve may be of leather, rubber, rawhide, or other suitable material and made of rings cut out and threaded upon the couplings, or the sleeve may be made up of one piece in any desired manner, care being taken that the end portions of the sleeve shall be of the same diameter, or nearly so, as the rope itself, and the end portions of the sleeve may also be flaring to receive the rounding portions of the ends of the rope where the same is united with the couplings, as illustrated in the drawings, and by making the middle portion of the sleeve less in diameter than the end portions the external contour of such sleeve will correspond, or nearly so, to the arc of the circle at the surface of the pulley or sheave around which the rope passes. A portion of this pulley or sheave is shown at E. Hence this sleeve around the metal coupling will prevent concussion of the metal coupling with the pulley or sheave and will also lessen the motion that otherwise there would be between the metal of the coupling and the fibrous portion of the rope or the connections or serving thereof, and thus avoid unnecessary wear and render the rope and its coupling more durable.

It will be understood that the couplings allow the rope to be twisted to a greater or less extent and the twist retained, or the couplings can be taken apart for separating the ends of the rope.

I claim as my invention—

1. The metal couplings for uniting the rope ends, each coupling having a recessed end for the reception of the folded end of the rope-strand, and an opening across through the metal coupling for the reception of serving composed of a cord passed over the folded strand and through the transverse opening in the metal coupling, substantially as set forth.

2. In combination with the rope ends having the strands folded upon themselves and spliced, of metallic coupling ends having transverse openings and a serving across the folded strands and through the openings in the metal coupling, substantially as set forth.

3. The combination with the rope, of a metal coupling of less diameter than the rope, a closely-fitted sleeve of yielding material around the metal coupling and supported by the same and of a diameter at the ends corresponding or nearly so to that of the rope, substantially as set forth.

4. The combination with the rope, of a metal coupling of less diameter than the rope, a sleeve around the metal coupling composed of yielding material and of a diameter at the ends corresponding or nearly so to that of the rope, the ends of the sleeve being flaring for the ends of the rope, substantially as set forth.

5. The combination with the rope, of a metal coupling, a sleeve around the metal coupling composed of yielding material and of a diameter at the ends corresponding or nearly so to that of the rope, the middle portion of the sleeve being of less diameter than the end portions so as to conform or nearly so to the surface of the sheave or pulley around which the rope and coupling pass, substantially as set forth.

Signed by me this 20th day of December, 1897.

THEO. L. MARVEL.

Witnesses:
GEO. T. PINCKNEY,
S. T. HAVILAND.